United States Patent Office 3,054,076
Patented Sept. 11, 1962

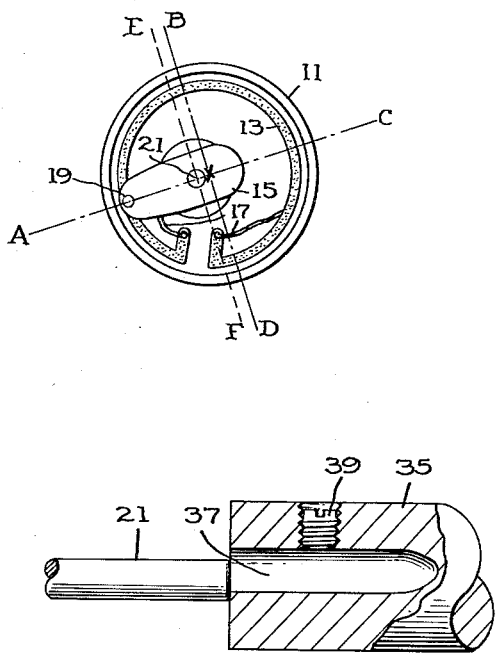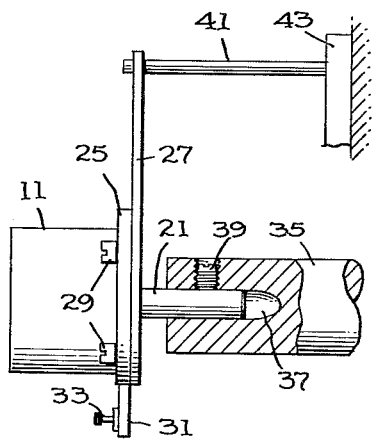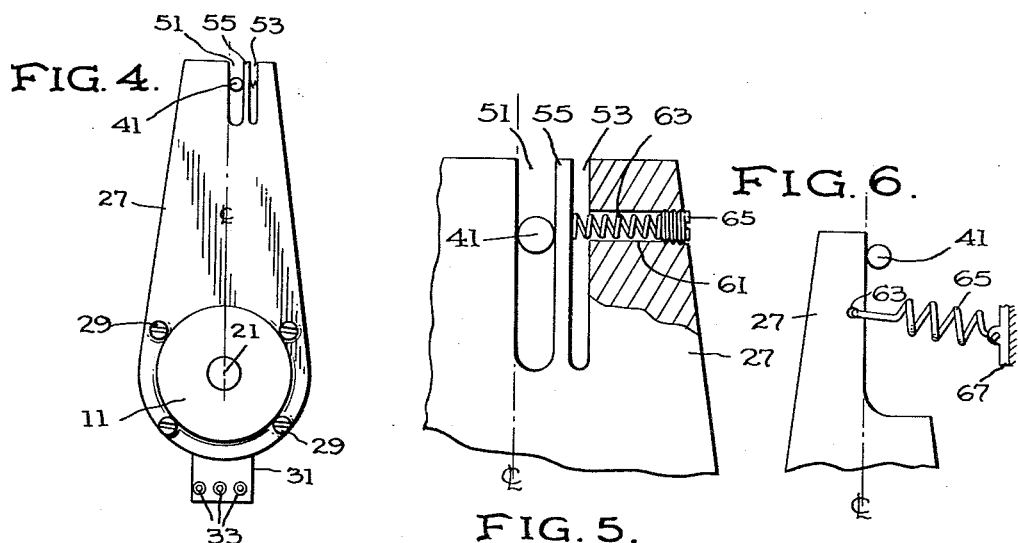

3,054,076
POTENTIOMETER
Ernest H. Treff, 166—25 12th Ave., Whitestone 57, N.Y.
Filed May 10, 1960, Ser. No. 28,071
7 Claims. (Cl. 338—162)

This invention relates to potentiometers, and, more particularly, to means for mounting potentiometer housings to reduce the adverse effects of eccentricities.

Potentiometers have a great many uses among which are uses as devices for providing electrical potentials proportional to the rotational deviation of mechanisms from a reference point. A potentiometer designed for this purpose consists essentially of a uniform circular resistive element across the ends of which an electrical potential may be applied. A wiper mounted on a rotating shaft is arranged so as to traverse the element. In the ideal case the potential measured between the wiper and one terminal is proportional to the angular excursion of the wiper from that terminal. A graph of these two variables should, in theory, be a straight line. Departures of the actual potential output of a potentiometer from this theoretically straight line, stated as a percentage of the applied voltage, is a measure of the precision of a potentiometer and is called its linearity. In recent years there has been a tendency for industrial and aircraft control systems to demand potentiomers of ever increasing accuracy. It is not unusual to require a linearity of 0.1% in a potentiometer in which the resistive element occupies a single flat circle and there are existing applications which require linearities of 0.05 and 0.01%. There has been a simultaneous demand for the miniaturization of precision potentiometers so that units having overall diameters of ¾ of an inch or even ½ inch are not unusual. The art of making resistive elements for potentiometers has advanced, so that elements to meet the above described requirements when measured in idealized mountings can be produced.

In the mass production of even precision equipment small variations occur. However, ways have been found to eliminate most of the errors once built into potentiometers, and the present equipment is remarkably precise, even in the smaller units. Even though great care in the manufacture of potentiometers has produced precise devices, the mounting of the poteniometer in its working environment may reintroduce all of the errors eliminated by accurate production.

It is one object of this invention to provide a new and improved mounting for a potentiometer.

It is a further object of this invention to provide new and improved mountings for precision potentiometers to eliminate errors introduced by mounting eccentricities.

Other objects and advantages of this application will become more apparent as the following description proceeds, which description should be considered together with the accompanying drawings, in which:

FIG. 1 is a diagrammatic sectional view of a circular potentiometer;

FIG. 2 is a side view, partially in section, of a circular potentiometer and its mounting means;

FIG. 3 is an enlarged view of two shafts;

FIG. 4 is an end view of the potentiometer of FIG. 2;

FIG. 5 is an enlarged view of a modification of the arm of FIG. 4; and

FIG. 6 is an elevational view of another modification of the arm of FIG. 4.

When an element must be mounted in a case, and the manufacture of the case and the operation of mounting must be carried out in a factory with reasonable quantity production, new problems arise. One of these is that due to variations in the dimensions of parts, the shaft which carries the wiper may not be perfectly concentric with the resistive element. The consequences of this lack of concentricity will be appreciated by an examination of FIG. 1. Here is shown diagrammatically a circular resistive element 13 mounted in a cylindrical housing 11, both of which have a center X. A wiper arm 15 carried by a shaft 21 has a wiper brush 19 which rides on the top surface of the resistance element 13 to establish an electrical connection therewith. Connection of the ends of the resistance element 13 with external circuitry is achieved through wires 17. The center of the shaft 21 is indicated by the intersection of the center line A—C and the dashed line E—F and does not coincide with the center of the resistance element 13, which center is indicated by the intersection of the two center lines A—C and B—D.

Starting with the wiper 15 in position as shown and rotating the shaft through 90° clockwise to position E, it will be clear that during this motion of the wiper, less than 90° of the resistive track 13 will have been traversed, since the 90° point on the track 13 is at B. Similarly between positions E and C of the wiper 15, which are also 90° apart on the track 13, more than 90° of the resistive element will have been traversed. As a consequence the lack of concentricity of shaft 21 and element 13 will cause an error in the potentiometer output which will vary approximately sinusoidally with the wiper position. The magnitude of this error is proportional to the distance between the centers of the shaft and the element and inversely proportional to the diameter of the element. Thus, the error can be reduced by increasing the size of the potentiometer, but demands for miniaturization of equipment places a contradictory restriction on the manufacturer.

Bearing in mind that many potentiometers are, in application, mounted with dogs by a servo flange, the existence of the above source of error has forced potentiometer manufacturers to maintain exceedingly close tolerances in the concentricity of the potentiometer shaft 21 to the resistive element 13, in the concentricity of the shaft 21 to the servo mount diameter, and in the perpendicularity of the shaft 21 to the mounting surface. These parameters must, in practice, be held to 0.001 or 0.0005 inches. While this requires a high degree of art, it can nevertheless be done.

A potentiometer does not serve a useful function, however, until it is connected to a working rotating mechanization of some sort. If this mechanization is a large massive or complicated structure as in a roll mill or an aircraft flight control, a new problem occurs. The user of the potentiometer must use the same sort of precaution as the manufacturer, or the accuracy of the unit will be lost. As has been noted, potentiometers are conventionally mounted in a fixed position on a solid base which serves as a frame of reference for the position of the shaft in question. FIG. 3 illustrates a shaft 21 of a potentiometer and a second shaft 35 having a central bore 37. It is common to mount the potentiometer housing, such as housing 11 of FIG. 1, by means of dogs or brackets to a fixed member with the potentiometer shaft 21 inserted in the bore 37. A set screw 39 retains the rigid connection between the two shafts 21 and 35. However, when the potentiometer housing is rigidly mounted, the shaft 21 may not be concentric with the bore 37, as shown in FIG. 3. If these two shafts, 21 and 35, are secured together rigidly, either of two things will happen. Shaft 21 may be twisted into an eccentric position with consequent eccentricity errors of the type described. If this does not happen, severe side thrusts will be placed on the potentiometer bearings with consequent extreme wear and short life. Again, a flexible coupling may be interposed between shaft 21 and shaft 35. Unfortunately, however, all known flexible couplings introduce errors similar to eccentricity errors. It is to the solution of this problem that the present invention is addressed.

If shafts 21 and 35 are rigidly connected and the housing of the potentiometer not firmly fixed in position but its angular orientation with respect to the frame of reference on which it was previously mounted is fixed, it is free to move with forces applied to the shaft 21. This amounts to saying that the potentiometer case is free to change its position but not to rotate. If the potentiometer case is free to move with its shaft without rotation and without putting a strain upon the shaft 21, there will be no error introduced in the potentiometer output by the eccentricity of shaft 21 with respect to shaft 35.

To accomplish this, the structure shown in FIGS. 2 and 4 is provided. A potentiometer casing 11 contains a circular resistance element and a wiper arm and brush (not shown) similar to those of FIG. 1. The wiper arm is mounted upon a shaft 21 which projects from the casing 11 and is rigidly held in an axial bore 37 of a drive shaft 35 by means of a set screw 39. The internal circuit elements are connected to a terminal board 31 supporting a plurality of terminals 33 for connection to external circuitry. An elongated arm 27 is mounted at one end on a flange or rim 25 of the housing 11 by any suitable fastening means such as screws 29. The other end of the arm 27, remote from the casing 11, has a pair of slots 51 and 53 formed therein to provide a resilient separating portion 55. Slot 51 is proportioned to snugly accept a fixedly positioned pin 41 which projects from any reference surface such as the outer casing of a driving servomotor.

The potentiometer of FIGS. 2 and 4 is supported by the coupling between the driving shaft 35 and the potentiometer shaft 21. By virtue of the resilient gripping of pin 41 in the slot 51, the potentiometer casing 11 (and the resistance element housed therein) are restrained from rotary movement in response to torque applied to the shaft 21. However, vertical and rocking movements about the pin 41 by the casing 11 are possible, leaving the housing 11 free to follow the movements of shaft 21 in all but rotation.

It is important that the pin 41 be gripped firmly but resiliently by the separating portion 55 to allow freedom of movement without lost motion. The gripping action can generally be provided by the proper dimensioning of teh slots 51 and 53 and the separating portion 55. However, to insure proper pressure upon the pin 41, auxiliary resilient biasing means may be provided as illustrated in FIG. 5. A threaded hole 61 is provided through a side of the arm 27 into communication with slot 53. A compression coil spring is inserted in the hole 61 and is forced against one side of the separating portion 55 by an adjusting screw 65 threaded into the hole 61. If necessary, the screw 65 can be adjusted during the life of the potentiometer to provide selective pressure on the separating portion 55.

The arm 27 need not be slotted to receive pin 41, but, as shown in FIG. 6, one side of the arm 27 may be resiliently held against pin 41. This side of the arm, like the left hand side of slot 51 in previously described embodiment, should constitute in projection an extension of the radius of shaft 21. A hole 63 has one end of an expansion spring 65 inserted therein. The other end of spring 65 is attached by any suitable means to a fixed member 67. The fixed member 67 may be a portion of the servo motor which drives the potentiometer shaft 21. When the potentiometer arm 21 is rotated, the spring 65 maintains one side of the arm 27 firmly against the pin 41. This effectively restrains the potentiometer housing 11 from rotating with the shaft 21, but allows the housing 11 freedom of vertical movement or rocking motion about the shaft 41 to relieve forces created by eccentricities between the shafe 21 and 35.

In the structure of this invention, a small precision potentiometer is provided with a shaft adapted to be rigidly connected to the shaft whose position is to be measured. The potentiometer case is provided with a relatively long arm adapted to be slidably engaged by a pin fixed on the reference structure of the device to which it is connected. The net effect of the arrangement is to reduce the eccentricity error in the assembly to that which would be expected for a potentiometer having a diameter equal to twice the length of the supporting arm. Accordingly, the accuracy which would have been expected of a much larger potentiometer has been obtained but with a great saving in space and weight.

It is appreciated that the above specification may suggest to others skilled in the art additional ways of carrying out the principles expressed above without departing from the invention. It is accordingly intended that this invention be limited only by the scope of the appended claims.

What is claimed is:

1. A self-adjusting support for a housing which is to be maintained concentric with a rotating system contained therein, said support comprising an elongated arm, means for fixedly attaching one end of said arm to the housing to be supported, said arm having a slot formed in its other end, and means rigidly supported with and closely within said slot to limit rotary motion of the housing and said arm, relative to one another.

2. A self-adjusting mounting for a potentiometer having its moving system positioned by rotary drive means, an elongated bracket fastened at one end to the housing of said potentiometer, the other end of said bracket having a slot formed therein, and a member mounted on a fixed base inserted in said slot to effectively restrain rotary motion of said housing.

3. A potentiometer comprising a housing and a shaft rotatably mounted in said housing, a bracket having one end connected to said housing, said bracket having an elongated slot formed in its other end, a fixedly mounted member engaging said slot to restrain rotation of said bracket, and means for resiliently engaging said member in said slot.

4. A potentiometer comprising a housing and a shaft rotatably mounted in said housing, means for rigidly coupling said shaft to a rotary drive means for supporting said potentiometer and positioning said shaft, a bracket having an elongated perforation in one end and being attached to said housing at the other end, a fixed base member penetrating said perforation, and means adjacent said perforation for frictionally engaging said member to prevent lost motion but allow minor adjusting movements of said housing.

5. A potentiometer adapted to be operated by a first rotating shaft, said potentiometer comprising a housing, a second shaft rotatably supported in said housing, said first and second shafts being coupled together to support said potentiometer and to transfer torque therebetween, and means for restraining rotation of said housing, said restraining means comprising an elongated bracket mounted on said housing and extending outwardly therefrom in a plane which is perpendicular to said second shaft, said bracket having an elongated perforation in its outwardly extending end, and a fixed member penerating said perforation to prevent rotation of said housing about the axis of said second shaft while allowing movement about the axis of said member to compensate for non-concentricity of said first and second shafts.

6. A self-adjusting support for a housing which is to be maintained relatively fixed with respect to a rotating system contained therein, said support comprising an elongated arm, means for fixedly attaching one end of said arm to a housing to be supported, a fixed stop member, and means for resiliently maintaining the other end of said arm against said stop member.

7. A potentiometer comprising a housing and a shaft rotatably mounted in said housing, a bracket having one end connected to said housing, a fixedly mounted member, and means for resiliently maintaining the other end of said bracket against said member.

References Cited in the file of this patent

UNITED STATES PATENTS

| | | |
|---|---|---|
| 1,590,166 | Howard | June 22, 1926 |
| 2,778,907 | Hamren | Jan. 22, 1957 |